United States Patent
Li et al.

(10) Patent No.: US 12,488,031 B2
(45) Date of Patent: Dec. 2, 2025

(54) INFORMATION SEARCHING METHOD AND APPARATUS, COMPUTER DEVICE, AND STORAGE MEDIUM

(71) Applicant: Beijing Zitiao Network Technology Co., Ltd., Beijing (CN)

(72) Inventors: Jun Li, Beijing (CN); Aonan Tan, Beijing (CN); Rendan Pan, Beijing (CN); Dongjin Huang, Beijing (CN); Ying Zhang, Beijing (CN)

(73) Assignee: Beijing Zitao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/736,264

(22) Filed: Jun. 6, 2024

(65) Prior Publication Data

US 2024/0419700 A1 Dec. 19, 2024

(30) Foreign Application Priority Data

Jun. 15, 2023 (CN) .......................... 202310711135.8

(51) Int. Cl.
*G06F 16/00* (2019.01)
*G06F 16/3329* (2025.01)

(52) U.S. Cl.
CPC ............................... *G06F 16/3329* (2019.01)

(58) Field of Classification Search
CPC .. G06F 16/3329; G06F 16/4393; G06F 16/45; G06F 16/335; G06F 16/3344; G06F 16/355; G06F 40/30

(Continued)

(56) References Cited

U.S. PATENT DOCUMENTS

2014/0137001 A1* 5/2014 Baldwin ................. G06F 3/048
715/753
2015/0161212 A1* 6/2015 Yang .................. G06F 16/9535
707/722

(Continued)

FOREIGN PATENT DOCUMENTS

CN 108243086 A 7/2018
CN 108960574 A 12/2018

(Continued)

OTHER PUBLICATIONS

Office action received from Chinese patent application No. 202310711135.8 mailed on Jul. 12, 2025, 20 pages (8 pages English Translation and 12 pages Original Copy).

*Primary Examiner* — Monica M Pyo

(57) ABSTRACT

The present disclosure provides an information searching method and information searching apparatus, a computer device, and a storage medium. The method includes: obtaining and presenting a plurality of question and answer topics in response to a searching operation for historical question and answer information, wherein the question and answer topics are determined based on aggregation results obtained by aggregating a plurality of rounds of historical question and answer information; obtaining, in response to any one of the plurality of question and answer topics represented being triggered, at least one sub-dimension tag under the question and answer topic; and presenting each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag.

20 Claims, 5 Drawing Sheets

---

S101: obtaining and presenting a plurality of question and answer topics in response to a searching operation for historical question and answer information, wherein the question and answer topics are determined based on aggregation results obtained by aggregating a plurality of rounds of historical question and answer information, and one of the plurality of rounds of historical question and answer information comprises one question and one answer result provided by a generative model S102: obtaining, in response to any one of the plurality of question and answer topics represented being triggered, at least one sub-dimension tag under the question and answer topic, wherein the at least one sub-dimension tag is determined based on an aggregation result and a dimension division manner corresponding to the question and answer topic, and the dimension division manner is determined based on a topic type of the question and answer topic S103: presenting each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag

(58) Field of Classification Search
USPC .......................................................... 707/758
See application file for complete search history.

(56) References Cited

U.S. PATENT DOCUMENTS

| | | | | |
|---|---|---|---|---|
| 2019/0370305 A1* | 12/2019 | Liu | ..................... | G06F 16/3329 |
| 2020/0372018 A1* | 11/2020 | Gross | ................. | G06Q 30/0243 |
| 2021/0271702 A1* | 9/2021 | Irie | ........................ | G06V 20/46 |

FOREIGN PATENT DOCUMENTS

| | | | |
|---|---|---|---|
| CN | 111817947 | A | 10/2020 |
| CN | 113673257 | A | 11/2021 |
| CN | 113779434 | A | 12/2021 |
| CN | 116226500 | A | 6/2023 |
| CN | 116541114 | A | 8/2023 |

\* cited by examiner obtaining and presenting a plurality of question and answer topics in response to a searching operation for historical question and answer information, wherein the question and answer topics are determined based on aggregation results obtained by aggregating a plurality of rounds of historical question and answer information, and one of the plurality of rounds of historical question and answer information comprises one question and one answer result provided by a generative model — S101 obtaining, in response to any one of the plurality of question and answer topics represented being triggered, at least one sub-dimension tag under the question and answer topic, wherein the at least one sub-dimension tag is determined based on an aggregation result and a dimension division manner corresponding to the question and answer topic, and the dimension division manner is determined based on a topic type of the question and answer topic — S102 presenting each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag — S103

Fig. 1

INFORMATION SEARCHING METHOD AND APPARATUS, COMPUTER DEVICE, AND STORAGE MEDIUM

CROSS-REFERENCE TO RELATED APPLICATION

This application claims priority to Chinese Patent Application No. 202310711135.8, filed on Jun. 15, 2023, the entire disclosure of which is incorporated herein by reference as part of the present disclosure.

TECHNICAL FIELD

The present disclosure relates to the technical field of computers, and in particular, to an information searching method and information searching apparatus, a computer device, and a storage medium.

BACKGROUND

With the rapid development of artificial intelligence technology, different forms of intelligent dialog models with different effects have emerged. A user may input a question to obtain an answer result provided by an intelligent dialog model. Such a "question and answer" process may be called a round of dialog. The user may obtain various kinds of desired information by having a plurality of rounds of dialogs with the intelligent dialog model.

However, as the time of use by the user increases, a great quantity of historical dialog contents will be generated. If there is a need to backtrack and find part of a great quantity of historical dialog contents, rounds of historical dialog contents are usually shown according to a sequential order of dialog times of the rounds of historical dialogs, and then a target content is found by manually sliding based on the rounds of historical dialog contents shown. The content searching efficiency is reduced.

SUMMARY

At least an embodiment of the present disclosure provides an information searching method, comprising: obtaining and presenting a plurality of question and answer topics in response to a searching operation for historical question and answer information, wherein the question and answer topics are determined based on aggregation results obtained by aggregating a plurality of rounds of historical question and answer information, and one of the plurality of rounds of historical question and answer information comprises one question and one answer result provided by a generative model; obtaining, in response to any one of the plurality of question and answer topics represented being triggered, at least one sub-dimension tag under the question and answer topic, wherein the at least one sub-dimension tag is determined based on an aggregation result and a dimension division manner corresponding to the question and answer topic, and the dimension division manner is determined based on a topic type of the question and answer topic; and presenting each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag.

For example, the sub-dimension tag is determined by following steps: in a case where the topic type of the question and answer topic is associated with an answer result of a plurality of genres, determining the dimension division manner corresponding to the question and answer topic as a genre division manner; and determining, by the genre division manner, each sub-dimension tag based on a content genre of a question and an answer result in each round of historical question and answer information in the aggregation result, wherein the sub-aggregation result comprises at least one target content, and the target content is a question or an answer result of a content genre corresponding to a sub-dimension tag in each round of historical question and answer information comprised in the aggregation result.

For example, the presenting a sub-aggregation result under a selected sub-dimension tag according to timing information of historical question and answer information comprises: presenting each target content aggregated under the selected sub-dimension tag according to the timing information of the historical question and answer information.

For example, the determining, by the genre division manner, each sub-dimension tag based on a content genre of a question and a answer result in each round of historical question and answer information in the aggregation result comprises: determining a genre of interest corresponding to the question and answer topic according to a topic intention of the question and answer topic; determining, by the genre division manner, genre tags based on content genres corresponding to the question and the answer result in each round of historical question and answer information comprised in the aggregation result; and taking a genre tag matching the genre of interest as the sub-dimension tag.

For example, the sub-dimension tag is determined by following steps: in a case where the topic type of the question and answer topic is associated with an answer result of a text type, determining the dimension division manner corresponding to the question and answer topic as a content division manner; and determining, by the content division manner, each sub-dimension tag based on an information content of each round of historical question and answer information comprised in the aggregation result.

For example, the presenting each sub-dimension tag comprises: presenting each sub-dimension tag and a dimension setting identifier.

For example, after presenting each sub-dimension tag and the dimension setting identifier, the information searching method further comprises: presenting each sub-dimension tag and each tag to be used in response to triggering the dimension setting identifier, wherein the tag to be used is obtained by dividing the aggregation result under the question and answer topic by a preset division manner other than the dimension division manner corresponding to the topic type among a plurality of preset division manners; and in response to a triggering operation for any tag to be used, presenting each round of historical question and answer information aggregated under the tag to be used according to the timing information of the historical question and answer information.

For example, the question and answer topic is determined by following steps: determining a target topic corresponding to each round of the historical question and answer information based on the question and the answer result of each round of the historical question and answer information; aggregating rounds of historical question and answer information according to a correlation degree between target topics corresponding to the rounds of historical question and answer information to obtain the aggregation results, wherein in a case where a aggregation result comprises multiple rounds of historical question and answer information, a correlation degree between target topics corresponding to the multiple rounds of historical question and answer information is greater than a preset correlation degree; and determining the question and answer topic corresponding to the aggregation result based on the target topic corresponding to each round of the historical question and answer information comprised in each aggregation result.

For example, the determining a target topic corresponding to each round of the historical question and answer information based on the question and the answer result of each round of the historical question and answer information comprises: for any one round of the historical question and answer information, determining a questioning intention feature of the question of the historical question and answer information based on semantic information of the question; determining a result intention feature of the answer result of the historical question and answer information based on semantic information of the answer result; and determining the target topic corresponding to the historical question and answer information based on the questioning intention feature and the result intention feature.

For example, the determining the target topic corresponding to the historical question and answer information based on the questioning intention feature and the result intention feature comprises: in a case where a feature matching degree between the questioning intention feature and the result intention feature is less than a preset matching degree, determining a first topic based on the questioning intention feature, and determining a second topic based on the result intention feature; and taking the first topic and the second topic as the target topic corresponding to the historical question and answer information.

At least an embodiment of the present disclosure provides an information searching apparatus, comprising: a first obtaining module configured to obtain and present a plurality of question and answer topics in response to a searching operation for historical question and answer information, wherein the question and answer topics are determined based on aggregation results obtained by aggregating a plurality of rounds of historical question and answer information, and one of the plurality of rounds of historical question and answer information comprises one question and one answer result provided by a generative model; a second obtaining module configured to obtain, in response to any one of the plurality of question and answer topics represented being triggered, at least one sub-dimension tag under the question and answer topic, wherein the at least one sub-dimension tag is determined based on an aggregation result and a dimension division manner corresponding to the question and answer topic, and the dimension division manner is determined based on a topic type of the question and answer topic; and a presenting module configured to present each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag.

At least an embodiment of the present disclosure provides a computer device, comprising a processor and a memory, wherein the memory stores machine-readable instructions executable by the processor; the processor is configured to execute the machine-readable instructions stored on the memory; and when the machine-readable instructions are executed by the processor, the information searching method according to any one of the above embodiments is implemented by the processor.

At least an embodiment of the present disclosure provides a non-transitory computer-readable storage medium on which a computer program is stored, wherein when the computer program is run by a computer device, the information searching method according to any one of the above embodiments is implemented by the computer device.

BRIEF DESCRIPTION OF DRAWINGS

The accompanying drawings, which are hereby incorporated in and constitute a part of the present description, illustrate embodiments of the present disclosure, and together with the description, serve to explain the principles of the embodiments of the present disclosure. To describe the technical solutions in the embodiments of the present disclosure or in the prior art more clearly, the accompanying drawings required in the description of the embodiments or the prior art will be described briefly below. Apparently, other accompanying drawings can also be derived from these drawings by those ordinarily skilled in the art without creative efforts.

FIG. 1 illustrates a flowchart of an information searching method provided by an embodiment of the present disclosure;

DETAILED DESCRIPTION

Figure 2:
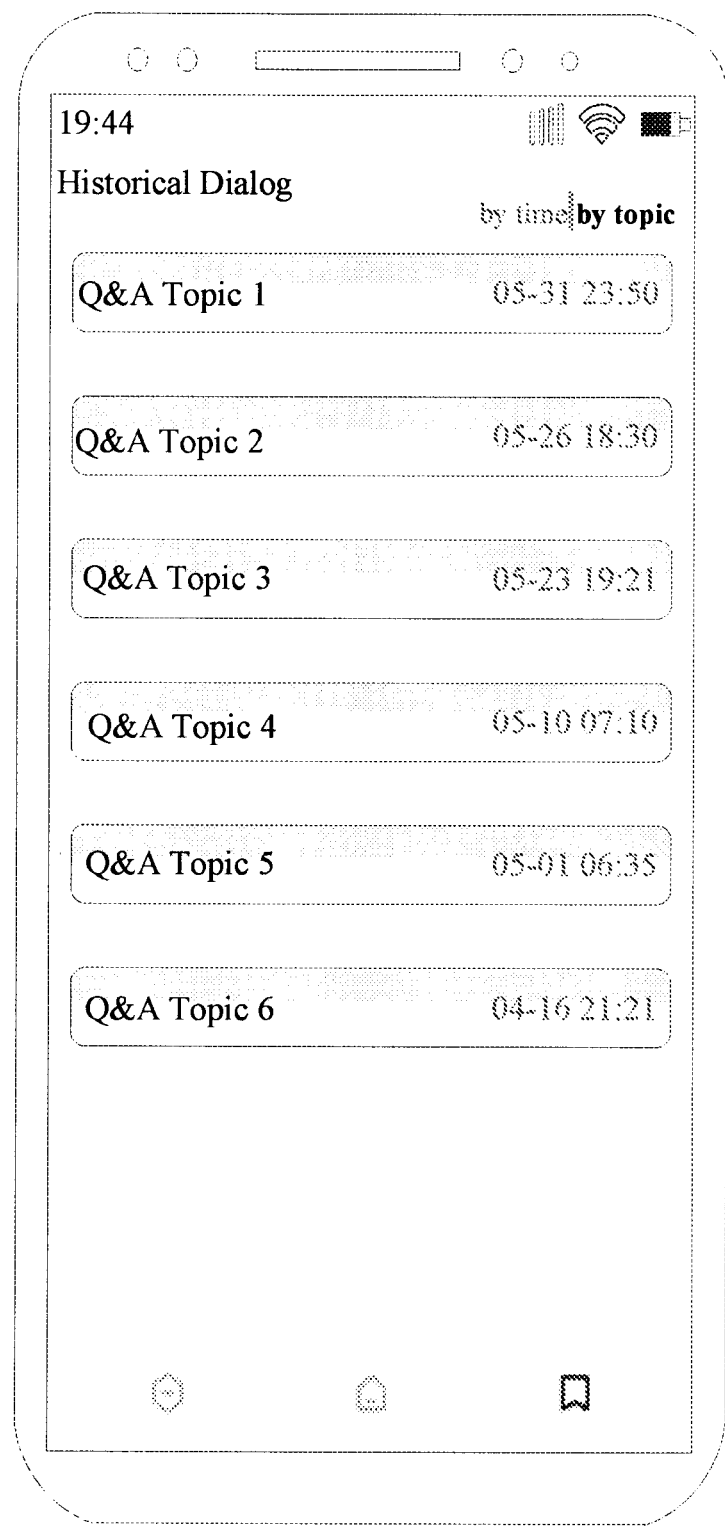
FIG. 2 illustrates a schematic diagram of presenting a plurality of question and answer topics provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Usually, the components of the embodiments of the present disclosure as described and illustrated herein could be arranged and designed in a wide variety of different configurations. Thus, the following detailed description of the embodiments of the disclosure is not intended to limit the protection scope of the disclosure, but is merely representative of optional embodiments of the disclosure. Based on the embodiments of the present disclosure, all other embodiments obtained by those skilled in the art without making creative labor belong to the scope of protection of the present disclosure.

The terms such as "first" and "second" in the description of the embodiments of the present disclosure, the claims, and the accompanying drawings are intended to distinguish between similar objects but do not necessarily indicate a specific order or sequence. It should be understood that the data used in such a way may be exchanged under proper conditions to make it possible to implement the described embodiments of the present disclosure in other orders than those illustrated or described here. The term "a plurality of" used herein refers to two or more. The term "and/or" describes associations between associated objects, and it indicates three types of relationships. For example, "A and/or B" may indicate that A exists alone, A and B coexist, or B exists alone. The character "/" generally indicates that the associated objects are in an "or" relationship.

Studies have shown that a common way of searching each round of historical dialog with an intelligent dialog model is searching by timing of each round of historical dialog or by a serial number of each round of historical dialog. Such a searching way has the problem of low searching efficiency. Especially when there are a large number of rounds of historical dialogs, the drawback of the low searching efficiency will become more obvious. Therefore, how to improve the information searching efficiency becomes a problem worthy of attention.

Based on the above studies, the embodiments of the present disclosure provide an information searching method and apparatus, a computer device, and a storage medium. Since different question and answer topics correspond to different historical question and answer information, by presenting a plurality of question and answer topics obtained by aggregating the historical question and answer information, not only can searching of the historical question and answer information be realized using the question and answer topics, but also the granularity of information searching can be refined. Rapid and accurate information searching may be realized. Compared with the way of searching the historical question and answer information using timing, searching the historical question and answer information by the question and answer topics may effectively improve the information searching efficiency while increasing the diversity of information searching ways and facilitating flexible information searching by a user. Moreover, the granularity of information searching can be further refined by presenting a sub-dimension tag under a given question topic and a sub-aggregation result under a selected sub-dimension tag. Finer granularity screening of the historical question and answer information under the question and answer topic using the sub-dimension tag is realized. Thus, rapid and accurate searching of the historical question and answer information is realized, and the information searching efficiency is further improved.

The shortcomings of the above solution are outcomes of practices and careful studies conducted by the inventors. Therefore, the process of discovering the above problems and the solutions proposed below in the present disclosure for the above problems should be regarded as contributions of the inventors to the present disclosure.

It should be noted that similar reference signs and letters represent similar items in the drawings below. Therefore, once an item is defined in one drawing, it does not need to be further defined and described in subsequent drawings.

It will be understood that before using the technical solutions disclosed in various embodiments of the present disclosure, a user should be notified of a type, a range of use, a usage scenario and the like of personal information involved in the present disclosure in an appropriate manner in accordance with relevant laws and regulations, and these should be authorized by the user.

In order to facilitate the understanding of the embodiments of the present disclosure, firstly, an information searching method disclosed by an embodiment of the present disclosure is introduced in detail. A performing agent for the information searching method provided by the embodiment of the present disclosure is generally a terminal device having a certain computing power or other processing device, where the terminal device may be a user equipment (UE), a mobile device, a user terminal, a terminal, a personal digital assistant (PDA), a hand-held device, a computer device, and the like. In some possible implementations, the information searching method may be implemented by a processor calling computer-readable instructions stored on a memory.

The information searching method provided by the embodiment of the present disclosure is illustrated below by taking for example that the performing agent is the computer device.

As illustrated in FIG. 1, there is shown a flowchart of an information searching method disclosed by an embodiment of the present disclosure. The method may include the following steps S101-S103.

S101: obtaining and presenting a plurality of question and answer topics in response to a searching operation for historical question and answer information, wherein the question and answer topics are determined based on aggregation results obtained by aggregating a plurality of rounds of historical question and answer information, and one of the plurality of rounds of historical question and answer information comprises one question and one answer result provided by a generative model.

Here, the historical question and answer information may be historical rounds of dialog information. One round of dialog information may include one question originated by a user and one answer result fed back by the generative model for the question. That is, one question and one answer result may be referred to as one round of dialog, i.e., one round of question and answer information. For example, the question may be "how to cook beef", "how to process XXXX", or "write an article about XXX". The generative model is an artificial intelligent (AI) model that is capable of performing semantic analysis on a question input by the user and feeding back a matching answer result based on an analysis result.

The question may include information under at least one information genre. For example, the information genre may be a text genre, an image genre, a link genre, a video genre, and the like. The answer result may also include information under at least one information genre.

The question and answer topic may be determined based on the aggregation results obtained by aggregating a plurality of rounds of historical question and answer information. One aggregation result may include at least one round of historical question and answer information, and each round of historical question and answer information included is related to the question and answer topic corresponding to the aggregation result. Different historical question and answer information is aggregated under different question and answer topics. The question and the answer result in one round of historical question and answer information may be aggregated in one aggregation result or may be aggregated in different aggregation results.

Exemplarily, the user may input a question in an intelligent dialog page and then the generative model may provide an answer result matching the question. In this way, one round of question and answer may be completed. The searching operation may be an operation initiated by the user in the intelligent dialog page, and the operation is used to find the historical question and answer information.

In a specific implementation, a plurality of question and answer topics nay be obtained by aggregating a plurality of rounds of historical question and answer information in response to the searching operation and then shown in the intelligent dialog page. FIG. 2 shows a schematic diagram of presenting a plurality of question and answer topics provided by an embodiment of the present disclosure. FIG. 2 shows question and answer topics 1 to 6, dialog time information corresponding to each question and answer topic, and two searching manner tags (i.e., "by time" and "by topic"), where the dialog time information may be determined by the dialog time of the latest historical question and answer information under this question and answer topic; the "by topic" tag is used to screen the historical question and answer information in the topic dimension after being triggered. In order to increase the diversity of searching manners, the "by time" tag may also be shown, which is, after being triggered, used to show rounds of historical question and answer information according to the timing of the rounds of historical question and answer information. Each question and answer topic may also be shown according to a sequential order of the dialog time information.

In an embodiment, the question and answer topic may be determined by the following steps S1-S3.

At S1: a target topic corresponding to each round of the historical question and answer information is determined based on the question and the answer result of each round of the historical question and answer information.

Here, the target topic is used to indicate an information topic to which historical question and answer information belongs.

In a specific implementation, for each round of historical question and answer information, respective key information corresponding to the question and the answer result in the historical question and answer information may be determined, and then the target topic corresponding to the round of historical question and answer information is determined by fusing the key information.

In an embodiment, S1 may be implemented by the following steps S1-1 to S1-3.

At S1-1, for any round of historical question and answer information, a questioning intention feature of the question is determined based on semantic information of the question of the historical question and answer information.

At S1-2, a result intention feature of the answer result is determined based on semantic information of the answer result of the historical question and answer information.

Here, the questioning intention feature is used to characterizing a questioning intention corresponding to the question, and the result intention feature is used to characterize an answer intention corresponding to the answer result. The result intensity may characterize an answer direction and an answer aim of the answer result.

In a specific implementation, for any round of the historical question and answer information, semantic recognition may be performed on the question of the historical question and answer information using a pre-trained intention prediction model to determine the semantic information corresponding to the question, and then the questioning intention feature corresponding to the question is determined based on the semantic information. Meanwhile, semantic recognition may be performed on the answer result of the historical question and answer information using the intention prediction model to determine the semantic information corresponding to the answer result, and then the result intention feature corresponding to the answer result may be determined based on the semantic information.

At S1-3, the target topic corresponding to the historical question and answer information is determined based on the questioning intention feature and the result intention feature.

In a specific implementation, a feature matching degree between the questioning intention feature and the result intention feature may be calculated. In the case where the feature matching degree is greater than or equal to a preset matching degree, the questioning intention feature and the result intention feature may be fused to obtain a fused feature, and the target topic corresponding to the historical question and answer information may be then determined from the fused feature.

On the contrary, in the case where the feature matching degree between the questioning intention feature and the result intention feature is less than the preset matching degree, a first topic may be determined based on the questioning intention feature, and a second topic may be determined based on the result intention feature. The first topic and the second topic may be then taken as the target topics corresponding to the target historical question and answer information.

Here, the preset matching degree may be set according to experience, which will not be particularly defined in the embodiments of the present disclosure. In the case where the feature matching degree is greater than or equal to the preset matching degree, it may indicate that there is good agreement between the question and the answer result and the question and the answer result are dialog information corresponding to the same intention. Then a unique target topic corresponding to the historical question and answer information may be obtained by feature fusion.

In the case where the feature matching degree is less than the preset matching degree, it may indicate that there is poor agreement between the question and the answer result, the answer effect may be poor, there may be a great deviation between the intentions of the question and the answer result, and there may be a great difference between the topics corresponding to both. Therefore, to realize reasonable aggregation of the historical question and answer information, the topics respectively determined by the questioning intention feature and the result intention feature may be taken as the target topics. In this way, although one round of historical question and answer information may correspond to two topics, the two topics may be close to this round of historical question and answer information, thereby improving the reasonability and accuracy of the determined target topic.

For example, the question is "how to cook beef" and the answer result is "beef may be cooked in the way of . . . ". Then, the questioning intention feature may be a beef cooking method and the result intention feature may be various types of beef cooking methods, and the beef cooking method may be directly taken as the target topic. However, in the case where the answer is inaccurate, i.e., the answer result may be "how to handle beef", the feature matching degree between the two intention features will be less than the preset matching degree. Therefore, two target topics may be determined based on the two intention features, e.g., the beef cooking method and the beef handling method.

At S2, rounds of historical question and answer information are aggregated according to a correlation degree between respective target topics corresponding to the rounds of historical question and answer information to obtain the aggregation results. In the case where the aggregation result includes multiple rounds of historical question and answer information, a correlation degree between the target topics corresponding to the multiple historical question and answer information is greater than a preset correlation degree.

Here, one aggregation result may include at least one round of historical question and answer information, and one piece of historical question and answer information may belong to one aggregation result.

In a specific implementation, after the respective target topics corresponding to the rounds of historical question and answer information are obtained, the correlation degree between the target topics corresponding to every two rounds of historical question and answer information may be determined, and the aggregation results may be then obtained by aggregating the historical question and answer information with the correlation degree greater than the preset correlation degree. It will be understood that if one aggregation result includes multiple rounds of historical question and answer information, the correlation degree between the target topics corresponding to any two rounds of historical question and answer information of the multiple rounds of historical question and answer information is greater than the preset correlation degree.

At S3, the question and answer topic corresponding to the aggregation result is determined based on the target topic corresponding to each round of historical question and answer information included in each aggregation result.

In a specific implementation, for each aggregation result, the target topics corresponding to the multiple rounds of historical question and answer information included in the aggregation result may be fused to obtain the question and answer topic corresponding to the aggregation result. Alternatively, for each aggregation result, a repeated content of the target topics corresponding to each round of historical question and answer information included in the aggregation result may be taken as the question and answer topic corresponding to the aggregation result. Alternatively, one target topic may be randomly selected as the question and answer topic from the target topics corresponding to the rounds of historical question and answer information included in the aggregation result.

Optionally, after the rounds of historical question and answer information are obtained, the rounds of historical question and answer information may be aggregated according to information contents of the questions and information contents of the answer results in the rounds of historical question and answer information to obtain the aggregation results. Meanwhile, the question and answer topic corresponding to the aggregation result may be determined based on the information content of each aggregation result.

S102: obtaining, in response to any one of the plurality of question and answer topics represented being triggered, at least one sub-dimension tag under the question and answer topic, wherein the at least one sub-dimension tag is determined based on an aggregation result and a dimension division manner corresponding to the question and answer topic, and the dimension division manner is determined based on a topic type of the question and answer topic.

Here, the dimension division manner is used to indicate a manner of dividing the historical question and answer information in the aggregation result under a question topic. Different dimension division manners focus on different information. The dimension division manner is determined according to the topic type of the question and answer topic, and the topic type may be determined based on an information genre included in the answer result of each round of historical question and answer information under the question and answer topic.

Exemplarily, the dimension division manner may include division by genre and division by content. For example, when the question and answer topic is a conventional topic, the dimension division manner may be determined as division by content. When the question and answer topic is a topic such as e-commerce and beauty makeup, the dimension division manner may be determined as division by genre.

The sub-dimension tag may be obtained by subdividing each historical question and answer information in the aggregation result under the question and answer topic based on the dimension division manner corresponding to the question and answer topic. At least one sub-dimension tag may be included under each question and answer topic. Different sub-dimension tags corresponding to different sub-aggregation results, and the sub-aggregation result may be obtained by dividing the aggregation result under the question and answer topic. The sub-aggregation result may include at least one of the question and the answer result of the historical question and answer information.

In a specific implementation, in response to any question and answer topic shown being triggered, sub-dimension tags under the question and answer topic and the sub-aggregation result under each sub-dimension tag may be obtained.

S103: presenting each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag.

Here, the target dimension is an information screening dimension corresponding to the sub-dimension tag and used to screen and aggregate each round of historical question and answer information in the aggregation result under the question and answer topic. Different sub-dimension tags correspond to different target dimensions. Exemplarily, the sub-dimension tag may be image and video, and the target dimension may be an image and video dimension. The sub-dimension tag may be "XX dish", and the target dimension is XX dish dimension.

The selected sub-dimension tag may be one of a plurality of sub-dimension tags that is selected by the user. It will be appreciated that when the plurality of sub-dimension tags are shown for the first time, the selected sub-dimension tag may be one selected by default. Then, the user may switch to show the sub-aggregation results under different sub-dimension tags by tapping on the sub-dimension tags shown.

In a specific implementation, after the sub-dimension tags and the sub-aggregation result under each sub-dimension tag are obtained, the sub-dimension tags may be presented, and each piece of information content in the sub-aggregation result under the selected sub-dimension tag may be presented according to the timing information (e.g., chronological order) of the historical question and answer information.

Figure 3:
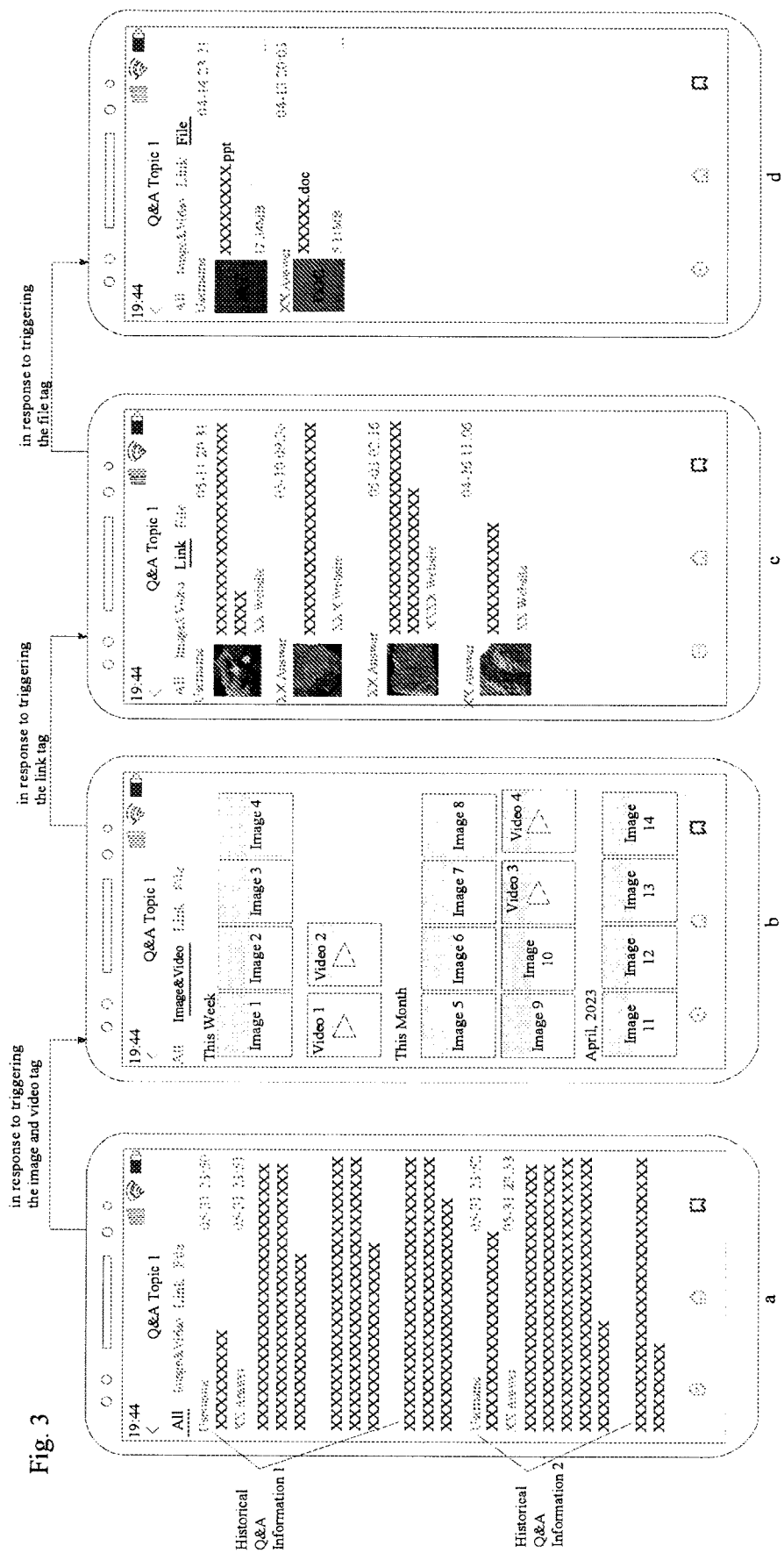
FIG. 3 illustrates a schematic diagram of presenting a sub-dimension tag and a sub-aggregation result provided by an embodiment of the present disclosure.

Exemplarily, in response to the question and answer topic 1 in FIG. 2 being triggered, a plurality of sub-dimension tags (e.g., an all tag, an image and video tag, a link tag, and a file tag) under the question and answer topic 1 may be obtained; meanwhile, the sub-aggregation result under each sub-dimension tag may be obtained. As illustrated in FIG. 3, there is shown a schematic diagram of presenting a sub-dimension tag and a sub-aggregation result provided by an embodiment of the present disclosure, where the page a in FIG. 3 indicates a presenting page after tapping on the question and answer topic 1 in FIG. 2, in which 4 sub-dimension tags, i.e., the all tag, the image and video tag, the link tag, and the file tag, are shown. The selected tag in the page a is the all tag, and the page a presents part of historical question and answer information (i.e., historical question and answer information 1 and historical question and answer information 2) in the sub-aggregation result under the all tag. The historical question and answer information is shown according to the timing information. The page b in FIG. 3 shows information contents in the sub-aggregation result under the image and video tag after the image and video tag is triggered, where the information contents are contents of the image or video genre. The page c in FIG. 3 shows information contents in the sub-aggregation result under the link tag after the link tag is triggered, including 1 historical question of the link genre and 3 historical answer results of the link genre shown according to the timing information. The page d in FIG. 3 shows information contents in the sub-aggregation result under the file tag after the file tag is triggered, including one historical question of the file genre and one historical answer result of the file genre shown according to the timing information.

In this way, since different question and answer topics correspond to different historical question and answer information, by presenting a plurality of question and answer topics obtained by aggregating the historical question and answer information, not only can searching of the historical question and answer information be realized using the question and answer topics, but also the granularity of information searching can be refined. Rapid and accurate information searching may be realized. Compared with the way of searching the historical question and answer information using timing, searching the historical question and answer information by the question and answer topics may effectively improve the information searching efficiency while increasing the diversity of information searching ways and facilitating flexible information searching by a user. Moreover, the granularity of information searching can be further refined by presenting a sub-dimension tag under a question topic and a sub-aggregation result under a selected sub-dimension tag. finer granularity screening of the historical question and answer information under the question and answer topic using the sub-dimension tag is realized. Thus, rapid and accurate searching of the historical question and answer information is realized, and the information searching efficiency is further improved.

In an embodiment, the dimension division manner may include a genre division manner of division by content genre and a content division manner of division by content. Different dimension division manners may correspond to different topic types. Specifically, the sub-dimension tag may be determined by the following steps P1-P2.

At P1, in the case where the topic type of the question and answer topic is associated with an answer result of a plurality of genres, the dimension division manner corresponding to the question and answer topic is determined as the genre division manner.

Here, whether each topic type can be associated with the answer result of a plurality of genres may be predetermined according to experience. One topic type can be associated with an answer result of a plurality of genres may be determined by whether the answer result under the question and answer topic of the topic type can include information of a plurality of genres and whether the proportions of the information of the genres are balanced. That is, if it is reasonable that each answer result under one topic type is of any genre, it may be determined that the topic type can be associated with the answer results of the plurality of genres.

For example, in the case where the topic type is a type such as a beauty makeup type, a life service type, a food type, or an e-commerce type, since the answer result under such topic types may often be information of any genre and a proportion of occurrence of the information of each genre is close, it may be determined that the topic type can be associated with the answer result of a plurality of genres. For another example, in the case where the topic type is a type such as a science popularization type or a landscape type, since the answer result under the topic type may tend to the information of a particular genre, it may be determined that the topic type cannot be associated with the answer result of a plurality of genres.

Optionally, it may be preset that each topic type may be associated with the answer result of a plurality of genres. In this way, for each question and answer topic, the aggregation result may be divided by the genre division manner to obtain each sub-dimension tag related to the genre.

In a specific implementation, for any question and answer topic, after the topic type of the question and answer topic is determined, whether the topic type can be associated with the answer results of a plurality of genres may be determined. If yes, the dimension division manner corresponding to the question and answer topic may be determined as the genre division manner; and if no, the dimension division manner corresponding to the question and answer topic may be determined as the content division manner.

At P2, each sub-dimension tag is determined by the genre division manner based on a content genre of the question and the answer result in each round of historical question and answer information in the aggregation result.

In a specific implementation, in the case where the dimension division manner is determined as the genre division manner, respective content genres corresponding to the question and the answer result in each round of historical question and answer information in the aggregation result may be determined by the genre division manner. Each sub-dimension tag may be then determined based on the respective content genres corresponding to the question and the answer result in each round of historical question and answer information.

For example, in a case where the respective content genres corresponding to the question and the answer result in each round of historical question and answer information in the aggregation result include the image genre, the video genre, the link genre, the file genre, and the text genre, the image genre, the video genre, the link genre, the file genre, and the text genre may be taken as the sub-dimension tags.

In an embodiment, in order to further improve the reasonability of the determined sub-dimension tag, P2 may also be implemented by the following steps P2-1 to P2-3.

At P2-1, a genre of interest corresponding to the question and answer topic is determined according to a topic intention of the question and answer topic.

Here, the topic intention is used to characterize a questioning intention corresponding to the question under the question and answer topic. Under different topic intentions, the answer results of different genres have different answer effects. That is, different topic intentions may correspond to different genres of interest. For any topic intention, the answer result under the genre of interest corresponding to the topic intention may have a better answer effect. For example, for the e-commerce field and the beauty makeup field, the answer results of the image and video genres often better meet the user's expectation. Therefore, the topic intention may be an image and video search intention, and the genre of interest may be the image and video genre. For the academic field, the answer result of the link and file genre often better meets the user's expectation. Therefore, the topic intention may be a link and file search intention, and the genre of interest may be the link and file genre. For the literature field, the answer result of the text genre often better meets the user's expectation. Therefore, the topic intention may be a text content search intention, and the genre of interest may be the text genre.

In a specific implementation, for any question and answer topic, semantic analysis may be performed on the question and answer topic to determine the topic intention corresponding to the question and answer topic, and the genre of interest under the question and answer topic may be then determined based on a preset association relationship between an intention and a genre. There may be one or more genres of interest under one question and answer topic.

At P2-2, genre tags are determined by the genre division manner based on respective content genres corresponding to the question and the answer result in each round of historical question and answer information included in the aggregation result.

In a specific implementation, respective content genres corresponding to the question and the answer result in each round of historical question and answer information in the aggregation result may be determined by the genre division manner. Then, for each content genre determined, the genre tag corresponding to the content genre is determined. For example, in a case where the determined content genre includes the image genre, the text genre, and the video genre, it may be determined that the genre tag includes the image tag, the text tag, and the video tag.

At P2-3, a genre tag matching the genre of interest is taken as the sub-dimension tag.

Here, whether one genre tag matches the genre of interest may be determined based on whether the genre corresponding to the genre tag is consistent with the genre of interest. For example, in a case where the genre of interest is the image and video genres, if the genre tag is the image tag, it may be determined that the genre tag matches the genre of interest. If the genre tag is the text tag, it may be determined that the genre tag does not match the genre of interest.

Exemplarily, after the genre tags are determined, for each genre tag, whether the genre tag matches the genre of interest may be determined. If yes, the genre tag may be taken as the sub-dimension tag; and if no, the genre tag may be neglected.

It will be appreciated that if the plurality of genre tags do not include the genre tag matching the genre of interest, in order to guarantee further division of the aggregation result, all the genre tags may be taken as the sub-dimension tags.

Optionally, in order to further improve the flexibility of screening by the user, the all tag may also be taken as one sub-dimension tag. In this way, the user may view and find all historical question and answer information in the aggregation result using the tag.

In this way, the aggregation result is divided by the genre division manner so that the sub-dimension tags under the question and answer topics can be determined accurately. Thus, finer granularity division of the aggregation result may be realized using the sub-dimension tag, and the efficiency and accuracy of information searching may be improved.

Further, for one round of historical question and answer information, since the content genres of the question and the answer result in the historical question and answer information may be inconsistent, after the sub-dimension tag is determined, when rounds of historical question and answer information in the aggregation result are aggregated using the sub-dimension tag, if both of the content genre of the question and the content genre of the answer result in one round of historical question and answer information match the sub-dimension tag, the entire round of historical question and answer information may be taken as the historical question and answer information in the sub-aggregation result under the sub-dimension tag. If only one of the content genre of the question and the content genre of the answer result in one round of historical question and answer information matches the sub-dimension tag, the entire round of historical question and answer information may be taken as the historical question and answer information in the sub-aggregation result under the sub-dimension tag.

Alternatively, if only the content genre of the question or the content genre of the answer result in one round of historical question and answer information matches the sub-dimension tag, the matched information may be taken as a target content in this round of historical question and answer information, and then the target content in each round of historical question and answer information may be taken as the historical question and answer information in the sub-aggregation result under the sub-dimension tag. In this case, the sub-aggregation result may include at least one target content. The target content is a question or an answer result of a content genre corresponding to a sub-dimension tag in each round of historical question and answer information included in the aggregation result. There may be two target contents corresponding to the same round of historical question and answer information. That is, both of the question and the answer result in this round of historical question and answer information match the sub-dimension tag.

In the case where the sub-aggregation result includes the target contents, for the step "presenting each sub-dimension tag, and presenting a sub-aggregation result under a selected sub-dimension tag according to timing information of historical question and answer information" in S103, the target contents aggregated under the selected sub-dimension tag may be shown directly according to the timing information of the historical question and answer information. If two target contents belong to the same round of historical question and answer information, the two target contents may be shown according to the timing information of the two target contents.

Exemplarily, the pages b, c, d in FIG. 3 are schematic diagrams of the target contents under the corresponding sub-dimension tags shown according to the timing information, where the target content is one of the question or the answer result in the historical question and answer information.

In another embodiment, the sub-dimension tag may also be determined by the following steps: in the case where the topic type of the question and answer topic is associated with an answer result of a text type, the dimension division manner corresponding to the question and answer topic is determined as the content division manner; each sub-dimension tag may be then determined by the content division manner based on an information content of each round of historical question and answer information included in the aggregation result.

Here, the information content of the historical question and answer information is the question and the answer result in the historical question and answer information. Whether each topic type can be associated with the answer result of the text type may also be predetermined according to experience. Whether a topic type can be associated with the answer result of the text type may be determined by whether a proportion of the information of the text genre in the answer result under the question and answer topic of the topic type is far more than a proportion of the information of other genres. That is, if a proportion of the answer result of the text type is far more than the proportion of the answer results of other genres among the answer results under one topic type, it may be determined that the topic type can be associated with the answer result of the text type. For example, in the case where the topic type is science popularization type or an article type, since the answer result under the topic type tends to be the information of the text genre, it may be determined that the topic type can be associated with the answer result of the text type.

Optionally, it may be preset that each topic type may be associated with the answer result of the text genre. In this way, for each question and answer topic, the aggregation result may be divided by the content division manner to obtain each sub-dimension tag related to the content.

Exemplarily, in the case where the topic type of the question and answer topic belongs to the field such as the fiction field, the prose field, and the science popularization field, it may be determined that the question and answer topic can be associated with the answer result of the text type, and then the dimension division manner corresponding to the question and answer topic may be determined as the content division manner. Subsequently, rounds of historical question and answer information are aggregated by the content division manner based on a degree of content correlation between the information contents of the rounds of historical question and answer information included in the aggregation result under the question and answer topic to obtain sub-aggregation results. A result topic of the sub-aggregation result may be then taken as the sub-dimension tag corresponding to the sub-aggregation result. For the step of determining, by the content division manner, the sub-dimension tag based on the information content of each round of historical question and answer information included in the aggregation result, a reference may be made to the step of determining the question and answer topic as described above at S1 to S3, which will not be described here redundantly.

Optionally, for any question and answer topic, the aggregation result under the question and answer topic may be divided by both the genre division manner and the content division manner to obtain a plurality of sub-dimension tags corresponding to the question and answer topic.

In an embodiment, for the step of "presenting the sub-dimension tag" in S103, in order to improve the flexibility of searching by the user, a dimension setting identifier may also be shown while presenting each sub-dimension tag. That is, each sub-dimension tag and the dimension setting identifier are shown simultaneously.

Here, the dimension setting identifier is used to select the sub-dimension tag needing to be used after being triggered.

After each sub-dimension tag and the dimension setting identifier are presented, the information searching method may further include: presenting each sub-dimension tag and each tag to be used in response to triggering the dimension setting identifier, wherein the tag to be used is obtained by dividing the aggregation result under the question and answer topic by a preset division manner other than the dimension division manner corresponding to the topic type among a plurality of preset division manners; and in response to a triggering operation for any tag to be used, presenting each round of historical question and answer information aggregated under the tag to be used according to the timing information of the historical question and answer information.

Here, the preset division manner may include the genre division manner and the content division manner. The tag to be used is obtained by dividing the aggregation result under a question and answer topic by the preset division manner other than the dimension division manner corresponding to the topic type of the question and answer topic. For example, in the case where the dimension division manner is the genre division manner, the tag to be used may be obtained by dividing rounds of historical question and answer information in the aggregation result under a question and answer topic by the content division manner.

Exemplarily, a page pop-up window may be generated in response to triggering the dimension setting identifier, and each sub-dimension tag and each determined tag to be used may be presented in the page pop-up window. In the page pop-up window, each sub-dimension tag is in the selected state, and the user may cancel the selected state in the page pop-up window. Subsequently, in response to a triggering operation for any tag to be used, each round of historical question and answer information aggregated under the tag to be used may be presented according to the timing information of the historical question and answer information.

Optionally, each tag in the selected state may be shown in response to an cancelling operation for a sub-dimension tag in the page pop-up window and a triggering operation for a plurality of tags to be used (at this time, the tags to be used will be in the selected state), and each round of historical question and answer information or each target content aggregated under any tag may be shown according to the timing information of the historical question and answer information.

Figure 4:
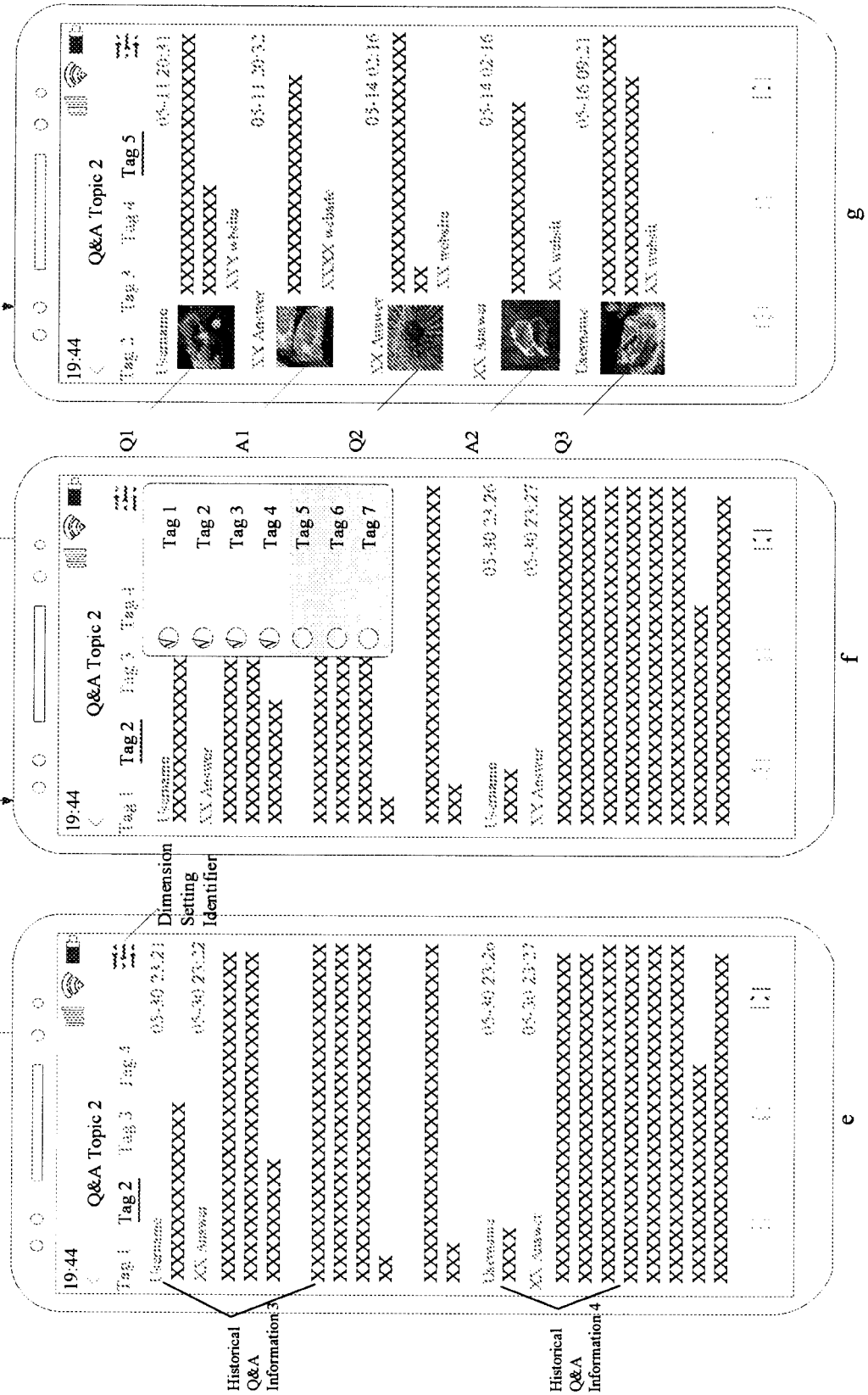
FIG. 4 illustrates a schematic diagram of a presenting process of a page pop-up window provided by an embodiment of the present disclosure.

As illustrated in FIG. 4, there is shown a schematic diagram of a presenting process of a page pop-up window provided by an embodiment of the present disclosure, where the page e in FIG. 4 shows 4 sub-dimension tags (i.e., tags 1 to 4) under the question and answer topic 2 and the dimension setting identifier; the selected tag in the page e is the tag 2, and two rounds of historical question and answer information (i.e., historical question and answer information 3 and historical question and answer information 4) are shown under the tag 2. Subsequently, the page pop-up window as shown in the page f in FIG. 4 may be shown in response to triggering the dimension setting identifier, and each sub-dimension tag and 3 tags to be used (i.e., tags 5 to 7) are shown in the page pop-up window. Tags 1 to 4 are in the selected state in the page pop-up window. Subsequently, the page as shown in the page g in FIG. 4 may be shown in response to the cancelling operation for a tag and in response to the triggering operation for the tag 5. The tags 2 to 5 and the target contents (i.e., questions 1 to 3 and answer results 1 and 2) aggregated under the tag 5 are shown in the page, and the target contents are shown according to the timing information.

In this way, by presenting the dimension setting identifier, it is convenient for the user to flexibly select the sub-dimension tag and screen the historical question and answer information in the aggregation result. The screening flexibility and the screening granularity are improved, which in turn is conducive to improving the accuracy and efficiency of information searching.

It will be appreciated by those skilled in the art that in the method described above, the order of writing the steps does not mean a strict performing order, which imposes no any limitation on the implementation process. The specific order of performing the steps should be determined by the functions thereof and a possible internal logic.

According to the same inventive concept, an embodiment of the present disclosure further provides an information searching apparatus corresponding to the information searching method. Since the principle of the apparatus to solve the problem in the embodiments of the present disclosure is the same as that of the information searching method in the embodiments of the present disclosure, the implementation of the apparatus may refer to the implementation of the method, and repetitions may not be described herein.

Figure 5:
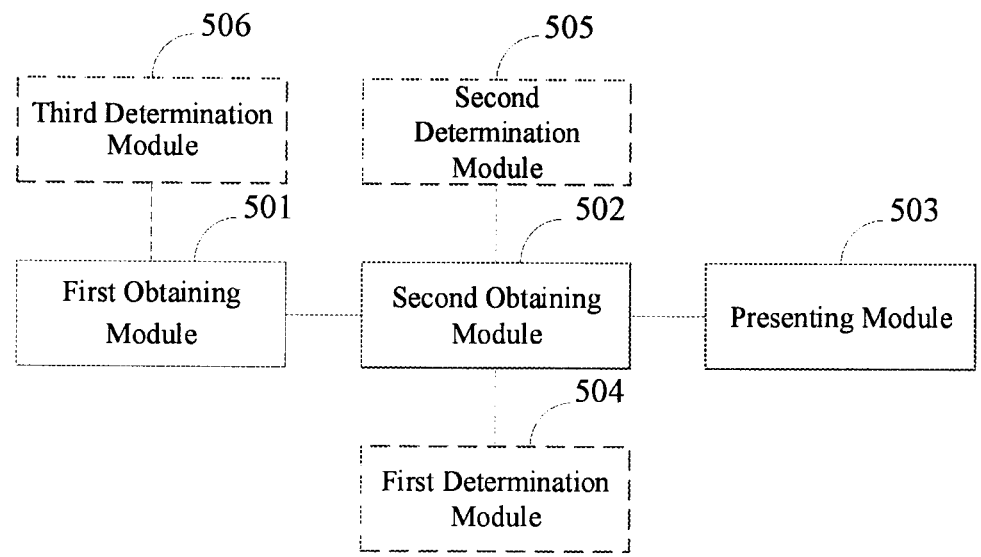
FIG. 5 illustrates a schematic diagram of an information searching apparatus provided by an embodiment of the present disclosure.

As illustrated in FIG. 5, there is shown a schematic diagram of an information searching apparatus provided by an embodiment of the present disclosure, including: a first obtaining module 501 configured to obtain and present a plurality of question and answer topics in response to a searching operation for historical question and answer information, wherein the question and answer topics are determined based on aggregation results obtained by aggregating a plurality of rounds of historical question and answer information, and one of the plurality of rounds of historical question and answer information comprises one question and one answer result provided by a generative model; a second obtaining module 502 configured to, obtain, in response to any one of the plurality of question and answer topics represented being triggered, at least one sub-dimension tag under the question and answer topic, wherein the at least one sub-dimension tag is determined based on an aggregation result and a dimension division manner corresponding to the question and answer topic, and the dimension division manner is determined based on a topic type of the question and answer topic; and a presenting module 503 configured to present each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag.

In a possible implementation, the apparatus further includes: a first determination module 504 configured to determine the sub-dimension tag by the following steps: in a case where the topic type of the question and answer topic is associated with an answer result of a plurality of genres, determining the dimension division manner corresponding to the question and answer topic as a genre division manner; and determining, by the genre division manner, each sub-dimension tag based on a content genre of a question and an answer result in each round of historical question and answer information in the aggregation result, wherein the sub-aggregation result comprises at least one target content, and the target content is a question or an answer result of a content genre corresponding to a sub-dimension tag in each round of historical question and answer information comprised in the aggregation result. The presenting module 503, when presenting the sub-aggregation result under the selected sub-dimension tag according to the timing information of the historical question and answer information, is configured to: present each target content aggregated under the selected sub-dimension tag according to the timing information of the historical question and answer information.

In a possible implementation, the first determination module 504, when determining, by the genre division manner, each sub-dimension tag based on a content genre of a question and an answer result in each round of historical question and answer information in the aggregation result, is configured to: determine a genre of interest corresponding to the question and answer topic according to a topic intention of the question and answer topic; determine, by the genre division manner, genre tags based on content genres corresponding to the question and the answer result in each round of historical question and answer information comprised in the aggregation result; and take a genre tag matching the genre of interest as the sub-dimension tag.

In a possible implementation, the apparatus further includes: a second determination module 505 configured to: in a case where the topic type of the question and answer topic is associated with an answer result of a text type, determining the dimension division manner corresponding to the question and answer topic as a content division manner; and determining, by the content division manner, each sub-dimension tag based on an information content of each round of historical question and answer information comprised in the aggregation result.

In a possible implementation, the presenting module 503, when presenting each sub-dimension tag, is configured to: present each sub-dimension tag and a dimension setting identifier. The presenting module 503, after presenting each sub-dimension tag and the dimension setting identifier, is further configured to: present each sub-dimension tag and each tag to be used in response to triggering the dimension setting identifier, wherein the tag to be used is obtained by dividing the aggregation result under the question and answer topic by a preset division manner other than the dimension division manner corresponding to the topic type among a plurality of preset division manners; and present, in response to a triggering operation for any tag to be used, each round of historical question and answer information aggregated under the tag to be used according to the timing information of the historical question and answer information.

In a possible implementation, the apparatus further includes: a third determination module 506 configured to determine a target topic corresponding to each round of the historical question and answer information based on the question and the answer result of each round of the historical question and answer information; aggregate rounds of historical question and answer information according to a correlation degree between target topics corresponding to the rounds of historical question and answer information to obtain the aggregation results, wherein in a case where a aggregation result comprises multiple rounds of historical question and answer information, a correlation degree between target topics corresponding to the multiple rounds of historical question and answer information is greater than a preset correlation degree; and determine the question and answer topic corresponding to the aggregation result based on the target topic corresponding to each round of the historical question and answer information comprised in each aggregation result.

In a possible implementation, the third determination module 506, when determining the target topic corresponding to each round of the historical question and answer information based on the question and the answer result of each round of the historical question and answer information, is configured to: for any one round of the historical question and answer information, determine a questioning intention feature of the question of the historical question and answer information based on semantic information of the question; determine a result intention feature of the answer result of the historical question and answer information based on semantic information of the answer result;

and determine the target topic corresponding to the historical question and answer information based on the questioning intention feature and the result intention feature.

In a possible implementation, the third determination module 506, when determining the target topic corresponding to the historical question and answer information based on the questioning intention feature and the result intention feature, is configured to: in a case where a feature matching degree between the questioning intention feature and the result intention feature is less than a preset matching degree, determine a first topic based on the questioning intention feature, and determining a second topic based on the result intention feature; and take the first topic and the second topic as the target topic corresponding to the historical question and answer information.

Regarding the descriptions of the processing flow of each module in the apparatus and an interactive flow between the modules, a reference may be made to the related descriptions in the above method embodiments, which will not be described in detail here.

Figure 6:
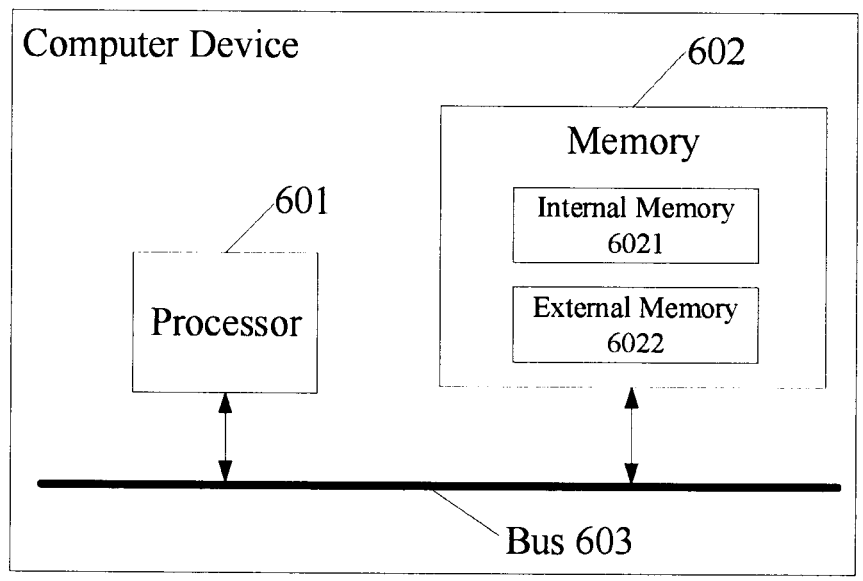
FIG. 6 illustrates a structural schematic diagram of a computer device provided by an embodiment of the present disclosure.

Based on the same technical concept, an embodiment of the present disclosure further provides a computer device. With reference to FIG. 6, there is shown a structural schematic diagram of a computer device provided by the embodiment of the present disclosure, including: a processor 601, a memory 602, and a bus 603. The memory 602 stores machine-readable instructions executable by the processor 601. The processor 601 is configured to execute the machine-readable instructions stored on the memory 602. When the machine-readable instructions are executed by the processor 601, the processor 601 performs the following steps: S101: obtaining and presenting a plurality of question and answer topics in response to a searching operation for historical question and answer information, wherein the question and answer topics are determined based on aggregation results obtained by aggregating a plurality of rounds of historical question and answer information, and one of the plurality of rounds of historical question and answer information comprises one question and one answer result provided by a generative model; S102: obtaining, in response to any one of the plurality of question and answer topics represented being triggered, at least one sub-dimension tag under the question and answer topic, wherein the at least one sub-dimension tag is determined based on an aggregation result and a dimension division manner corresponding to the question and answer topic, and the dimension division manner is determined based on a topic type of the question and answer topic; and S103: presenting each sub-dimension tag, and presenting a sub-aggregation result under a selected sub-dimension tag according to timing information of historical question and answer information, wherein the sub-aggregation result is obtained by aggregating the aggregation result according to a target dimension indicated by the selected sub-dimension tag.

The memory 602 includes an internal memory 6021 and an external memory 6022. The internal memory 6021 mentioned here is also referred to as an internal memory for temporarily storing operational data in the processor 601 and data exchanged with the external memory 6022 such as a hard disk. The processor 601 exchanges data with the external memory 6022 through the internal memory 6021. When the computer device runs, the processor 601 is in communication with the memory 602 by the bus 603 such that the processor 601 executes the executable instructions mentioned in the above method embodiments.

An embodiment of the present disclosure further provides a computer-readable storage medium. The computer-readable storage medium stores a computer program. The computer program, when run by a processor, causes implementing the information searching method in the above method embodiments. The storage medium may be a volatile or nonvolatile computer-readable storage medium.

A computer program product of the information searching method provided in an embodiment of the present disclosure includes the computer-readable storage medium storing a program code. Instructions included in the program code may be used to perform the steps of the information searching method in the above embodiments. For details, a reference may be made to the above method embodiments, which will not be described here redundantly.

The computer program product may be implemented specifically by hardware, software, or a combination thereof. In one optional embodiment, the computer program product is embodied as a computer storage medium. In another optional embodiment, the computer program product is embodied as a software product, e.g., a software development kit (SDK) and the like.

A person skilled in the art can clearly understand that, for convenience and brevity of description, a reference may be made to corresponding processes in the foregoing method embodiments for the specific working process of the apparatus described above, which will not be described here redundantly. In several embodiments provided in the present disclosure, it should be understood that the disclosed apparatus and method may be implemented in other manners. The apparatus embodiments described above are merely schematic. For example, the unit division is merely logical function division and may be another division in actual implementation. For another example, a plurality of units or components may be combined, or some features may be ignored or not performed. In addition, the displayed or discussed mutual couplings or direct couplings or communication connections may be implemented through some communication interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

If implemented in a form of a software functional unit and sold or used as a stand-alone product, functions may be stored in a nonvolatile computer-readable storage medium executable by a processor. Based on such understanding, the technical solutions of the present disclosure essentially, or a part contributing to the prior art, or part of the technical solutions may be implemented in a form of a software product. The computer software product is stored in a storage medium, and includes several instructions for enabling a computer device (which may be a personal computer, a server, a network device, or the like) to perform all or some steps of the method described in the embodiments of the present disclosure. The storage medium includes any medium capable of storing a program code, such as a USB flash disk, a mobile hard disk, a read-only memory (ROM), a random access memory (RAM), a magnetic disk, or an optical disk.

If the technical solutions of the present disclosure involve personal information, a product applying the technical solutions of the present disclosure has been explicitly informed of a personal information processing rule and has gotten an autonomous consent of a person before processing the personal information. If the technical solutions of the present disclosure involve sensitive personal information, a product applying the technical solutions of the present disclosure has gotten an individual consent of a person and meets the requirement of express consent before processing the sensitive personal information. For example, at a personal information collection apparatus such as a camera, an explicit and significant identifier is set to indicate a personal information collection range in which personal information will be collected. If a person willingly enters the collection range, it is deemed to be the agreement to collect the personal information thereof. Alternatively, on a personal information processing apparatus, in a case where the personal information processing rule is informed using an obvious identifier/information, individual authorization is obtained by pop-up window information or requiring a person to upload the personal information thereof, where the personal information processing rule may include information such as a personal information handler, a personal information processing purpose, a processing way, and a type of personal information processed.

Finally, it should be noted that the above embodiments are merely specific implementations of the present disclosure, and are used to describe rather than limit the technical solutions of the present disclosure. The protection scope of the present disclosure is not limited thereto. Although the present disclosure is described in detail with reference to the above embodiments, it should be understood that a person of ordinary skill in the art can still make modifications to or readily figure out changes in the technical solutions described in the above embodiments, or make equivalent substitutions on some technical features therein. These modifications, changes, or substitutions do not make the essence of the corresponding technical solutions depart from the spirit and scope of the technical solutions of the embodiments of the present disclosure, and shall all fall within the protection scope of the present disclosure. Therefore, the protection scope of the present disclosure shall be subject to the protection scope of the claims.

The invention claimed is:

1. An information searching method, comprising:
   obtaining, in response to receiving a question input on a terminal device, an answer result to the question through a generative model, thereby obtaining a plurality of rounds of historical question and answer information, each of the plurality of rounds of historical question and answer information comprising one question and one answer result provided by the generative model;
   in response to a searching operation for historical question and answer information, obtaining a plurality of aggregation results by aggregating the plurality of rounds of historical question and answer information, and obtaining and presenting a plurality of question and answer topics corresponding to the plurality of aggregation results on the terminal device;
   obtaining and presenting, in response to any one of the plurality of question and answer topics represented being triggered, a plurality of sub-dimension tags under the question and answer topic on the terminal device based on an aggregation result and a dimension division manner corresponding to the question and answer topic, wherein the dimension division manner is determined based on a topic type of the question and answer topic; and
   presenting, in response to any one of the plurality of sub-dimension tags being selected, a sub-aggregation result under a selected sub-dimension tag on the terminal device according to timing information of historical question and answer information, wherein the sub-aggregation result is obtained by aggregating the plurality of aggregation results according to a target dimension indicated by the selected sub-dimension tag.

2. The information searching method according to claim 1, wherein the sub-dimension tag is determined by following steps:
   in a case where the topic type of the question and answer topic is associated with an answer result of a plurality of genres, determining the dimension division manner corresponding to the question and answer topic as a genre division manner; and
   determining, by the genre division manner, each sub-dimension tag based on a content genre of a question and an answer result in each of the plurality of rounds of historical question and answer information in the aggregation result,
   wherein the sub-aggregation result comprises at least one target content, and the target content is a question or an answer result of a content genre corresponding to a sub-dimension tag in each round of historical question and answer information comprised in the aggregation result.

3. The information searching method according to claim 2, wherein the presenting a sub-aggregation result under a selected sub-dimension tag according to timing information of historical question and answer information comprises:
   presenting each target content aggregated under the selected sub-dimension tag according to the timing information of the historical question and answer information.

4. The information searching method according to claim 2, wherein the determining, by the genre division manner, each sub-dimension tag based on a content genre of a question and a answer result in each round of historical question and answer information in the aggregation result comprises:
   determining a genre of interest corresponding to the question and answer topic according to a topic intention of the question and answer topic;
   determining, by the genre division manner, genre tags based on content genres corresponding to the question and the answer result in each round of historical question and answer information comprised in the aggregation result; and
   taking a genre tag matching the genre of interest as the sub-dimension tag.

5. The information searching method according to claim 1, wherein the plurality of sub-dimension tags are determined by following steps:
   in a case where the topic type of the question and answer topic is associated with an answer result of a text type, determining the dimension division manner corresponding to the question and answer topic as a content division manner; and
   determining, by the content division manner, each sub-dimension tag based on an information content of each round of historical question and answer information comprised in the aggregation result.

6. The information searching method according to claim 1, wherein the presenting a plurality of sub-dimension tags under the question and answer topic on the terminal device comprises:
presenting each of the plurality of sub-dimension tags and a dimension setting identifier.

7. The information searching method according to claim 6, after presenting each sub-dimension tag and the dimension setting identifier, further comprising:
presenting each sub-dimension tag and each tag to be used in response to triggering the dimension setting identifier, wherein the tag to be used is obtained by dividing the aggregation result under the question and answer topic by a preset division manner other than the dimension division manner corresponding to the topic type among a plurality of preset division manners; and
in response to a triggering operation for any tag to be used, presenting each round of historical question and answer information aggregated under the tag to be used according to the timing information of the historical question and answer information.

8. The information searching method according to claim 1, wherein the obtaining a plurality of aggregation results by aggregating the plurality of rounds of historical question and answer information and the obtaining a plurality of question and answer topics corresponding to the plurality of aggregation results comprises:
determining a target topic corresponding to each round of the historical question and answer information based on the question and the answer result of each round of the historical question and answer information;
aggregating the plurality of rounds of historical question and answer information according to a correlation degree between target topics corresponding to the plurality of rounds of historical question and answer information to obtain the plurality of aggregation results, wherein in a case where a aggregation result comprises multiple rounds of historical question and answer information, a correlation degree between target topics corresponding to the multiple rounds of historical question and answer information is greater than a preset correlation degree; and
determining a question and answer topic corresponding to each of the plurality of aggregation results based on a target topic corresponding to each round of historical question and answer information comprised in each aggregation result.

9. The information searching method according to claim 8, wherein the determining a target topic corresponding to each round of the historical question and answer information based on the question and the answer result of each round of the historical question and answer information comprises:
for any one round of the historical question and answer information, determining a questioning intention feature of the question of the historical question and answer information based on semantic information of the question;
determining a result intention feature of the answer result of the historical question and answer information based on semantic information of the answer result; and
determining the target topic corresponding to the historical question and answer information based on the questioning intention feature and the result intention feature.

10. The information searching method according to claim 9, wherein the determining the target topic corresponding to the historical question and answer information based on the questioning intention feature and the result intention feature comprises:
in a case where a feature matching degree between the questioning intention feature and the result intention feature is less than a preset matching degree, determining a first topic based on the questioning intention feature, and determining a second topic based on the result intention feature; and
taking the first topic and the second topic as the target topic corresponding to the historical question and answer information.

11. A computer device, comprising a processor and a memory, wherein the memory stores machine-readable instructions executable by the processor; the processor is configured to execute the machine-readable instructions stored on the memory; and when the machine-readable instructions are executed by the processor, an information searching method is implemented by the processor, comprising:
obtaining, in response to receiving a question input on a terminal device, an answer result to the question through a generative model, thereby obtaining a plurality of rounds of historical question and answer information, each of the plurality of rounds of historical question and answer information comprising one question and one answer result provided by the generative model;
in response to a searching operation for historical question and answer information, obtaining a plurality of aggregation results by aggregating the plurality of rounds of historical question and answer information, and obtaining and presenting a plurality of question and answer topics corresponding to the plurality of aggregation results on the terminal device;
obtaining and presenting, in response to any one of the plurality of question and answer topics represented being triggered, a plurality of sub-dimension tags under the question and answer topic on the terminal device based on an aggregation result and a dimension division manner corresponding to the question and answer topic, wherein the dimension division manner is determined based on a topic type of the question and answer topic; and
presenting, in response to any one of the plurality of sub-dimension tags being selected, a sub-aggregation result under a selected sub-dimension tag on the terminal device according to timing information of historical question and answer information, wherein the sub-aggregation result is obtained by aggregating the plurality of aggregation results according to a target dimension indicated by the selected sub-dimension tag.

12. The computer device according to claim 11, wherein the sub-dimension tag is determined by following steps:
in a case where the topic type of the question and answer topic is associated with an answer result of a plurality of genres, determining the dimension division manner corresponding to the question and answer topic as a genre division manner; and
determining, by the genre division manner, each sub-dimension tag based on a content genre of a question and an answer result in each round of historical question and answer information in the aggregation result, wherein the sub-aggregation result comprises at least one target content, and the target content is a question or an answer result of a content genre corresponding to a sub-dimension tag in each of the plurality of rounds of historical question and answer information comprised in the aggregation result.

13. The computer device according to claim 12, wherein the presenting a sub-aggregation result under a selected sub-dimension tag according to timing information of historical question and answer information comprises:
presenting each target content aggregated under the selected sub-dimension tag according to the timing information of the historical question and answer information.

14. The computer device according to claim 12, wherein the determining, by the genre division manner, each sub-dimension tag based on a content genre of a question and a answer result in each round of historical question and answer information in the aggregation result comprises:
determining a genre of interest corresponding to the question and answer topic according to a topic intention of the question and answer topic;
determining, by the genre division manner, genre tags based on content genres corresponding to the question and the answer result in each round of historical question and answer information comprised in the aggregation result; and
taking a genre tag matching the genre of interest as the sub-dimension tag.

15. The computer device according to claim 11, wherein the sub-dimension tag is determined by following steps:
in a case where the topic type of the question and answer topic is associated with an answer result of a text type, determining the dimension division manner corresponding to the question and answer topic as a content division manner; and
determining, by the content division manner, each sub-dimension tag based on an information content of each round of historical question and answer information comprised in the aggregation result.

16. A non-transitory computer-readable storage medium on which a computer program is stored, wherein when the computer program is run by a computer device, an information searching method is implemented by the computer device, comprising:
obtaining, in response to receiving a question input on a terminal device, an answer result to the question through a generative model, thereby obtaining a plurality of rounds of historical question and answer information, each of the plurality of rounds of historical question and answer information comprising one question and one answer result provided by the generative model;
in response to a searching operation for historical question and answer information, obtaining a plurality of aggregation results by aggregating the plurality of rounds of historical question and answer information, and obtaining and presenting a plurality of question and answer topics corresponding to the plurality of aggregation results on the terminal device;
obtaining and presenting, in response to any one of the plurality of question and answer topics represented being triggered, a plurality of sub-dimension tags under the question and answer topic, wherein the at least one sub-dimension tag is determined based on an aggregation result and a dimension division manner corresponding to the question and answer topic, wherein the dimension division manner is determined based on a topic type of the question and answer topic; and
presenting, in response to any one of the plurality of sub-dimension tags being selected, a sub-aggregation result under a selected sub-dimension tag on the terminal device according to timing information of historical question and answer information, wherein the sub-aggregation result is obtained by aggregating the plurality of aggregation results according to a target dimension indicated by the selected sub-dimension tag.

17. The storage medium according to claim 16, wherein the sub-dimension tag is determined by following steps:
in a case where the topic type of the question and answer topic is associated with an answer result of a plurality of genres, determining the dimension division manner corresponding to the question and answer topic as a genre division manner; and
determining, by the genre division manner, each sub-dimension tag based on a content genre of a question and an answer result in each of the plurality of rounds of historical question and answer information in the aggregation result,
wherein the sub-aggregation result comprises at least one target content, and the target content is a question or an answer result of a content genre corresponding to a sub-dimension tag in each round of historical question and answer information comprised in the aggregation result.

18. The storage medium according to claim 17, wherein the presenting a sub-aggregation result under a selected sub-dimension tag according to timing information of historical question and answer information comprises:
presenting each target content aggregated under the selected sub-dimension tag according to the timing information of the historical question and answer information.

19. The storage medium according to claim 17, wherein the determining, by the genre division manner, each sub-dimension tag based on a content genre of a question and a answer result in each round of historical question and answer information in the aggregation result comprises:
determining a genre of interest corresponding to the question and answer topic according to a topic intention of the question and answer topic;
determining, by the genre division manner, genre tags based on content genres corresponding to the question and the answer result in each round of historical question and answer information comprised in the aggregation result; and
taking a genre tag matching the genre of interest as the sub-dimension tag.

20. The storage medium according to claim 16, wherein the sub-dimension tag is determined by following steps:
in a case where the topic type of the question and answer topic is associated with an answer result of a text type, determining the dimension division manner corresponding to the question and answer topic as a content division manner; and
determining, by the content division manner, each sub-dimension tag based on an information content of each round of historical question and answer information comprised in the aggregation result.

* * * * *